US012570094B2

(12) United States Patent
Takemoto

(10) Patent No.: US 12,570,094 B2
(45) Date of Patent: Mar. 10, 2026

(54) INKJET RECORDING APPARATUS

(71) Applicant: CANON KABUSHIKI KAISHA, Tokyo (JP)

(72) Inventor: Satoshi Takemoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/637,931

(22) Filed: Apr. 17, 2024

(65) Prior Publication Data

US 2024/0359488 A1 Oct. 31, 2024

(30) Foreign Application Priority Data

Apr. 25, 2023 (JP) ................................ 2023-071900

(51) Int. Cl.
*B41J 11/00* (2006.01)
*B41J 13/08* (2006.01)

(52) U.S. Cl.
CPC .......... *B41J 11/0022* (2021.01); *B41J 13/08* (2013.01)

(58) Field of Classification Search
CPC .............................. B41J 11/0022; B41J 13/08
See application file for complete search history.

(56) References Cited

U.S. PATENT DOCUMENTS

2021/0155017 A1* 5/2021 Sato ......................... B41J 11/04

FOREIGN PATENT DOCUMENTS

JP 2010188624 A 9/2010

* cited by examiner

*Primary Examiner* — Bradley W Thies
(74) *Attorney, Agent, or Firm* — Canon U.S.A., Inc. IP Division

(57) ABSTRACT

An inkjet recording apparatus includes an ink image formation unit to form an ink image on a recording medium, and a drying module having a conveyance unit to convey the recording medium, an air blowing unit to blow air, a duct, and first and second heating units to dry the recording medium on which the ink image is formed. The duct is arranged above the conveyance unit in a vertical direction and guides air blown by the air blowing unit to the conveyed recording medium. The first and second heating units heats air in the duct. The second heating unit is arranged downstream of the first heating unit in a direction of a current of air generated by the air blowing unit. When being viewed along the direction of the air current, the second heating unit includes a part not overlapping the first heating unit.

11 Claims, 8 Drawing Sheets

INKJET RECORDING APPARATUS

BACKGROUND

Field

The present disclosure relates to an inkjet recording apparatus that forms an image by applying ink to a recording medium.

Description of the Related Art

In the market of commercial digital printing, there is an increasing demand for cut-sheet machines that realize high image quality, high speed, and high productivity. For commercial digital printing, inkjet image forming apparatuses are proposed. In inkjet image forming apparatuses, because a liquid such as a primer or ink is put onto a sheet, it is necessary to perform a step of drying the liquid on the sheet.

There is proposed a step of fixing ink on a recording medium having undergone a drying step by a fixing unit in order to improve chafing-proof properties. Japanese Patent Application Laid-Open No. 2010-188624 discusses an image forming apparatus that performs a drying step and a fixing step. For the fixing step, two rotary members are provided. The two rotary members form a nip part through which a recording medium passes. In this manner, fixing the ink applied to the recording medium in the fixing step improves the chafing-proof properties.

In drying the recording medium to which the ink is applied, hot air is blown onto the recording medium. The recording medium is dried by the hot air blown from above a conveyance path.

Specifically, an air current is generated by an air blowing unit in a duct arranged above the conveyance path. The air current is guided by the duct to a spouting port and is blown onto the recording medium. Accordingly, in order to obtain the hot air, it is necessary to heat the air in the duct and enhance the efficiency of heating the air. If low-temperature air is blown onto the recording medium, the recording medium may not be sufficiently dried, which may cause a reduction in the productivity.

SUMMARY

An inkjet recording apparatus according to the present disclosure is directed to, in a configuration where a recording medium is dried by blowing heated air onto the recording medium, improving the efficiency of heating the air and increasing the efficiency of drying.

According to an aspect of the present disclosure, an inkjet recording apparatus includes an ink image formation unit configured to form an ink image on a recording medium, and a drying module configured to dry the recording medium on which the ink image is formed by the ink image formation unit, wherein the drying module includes a conveyance unit configured to convey the recording medium, an air blowing unit configured to blow air, a duct that is arranged above the conveyance unit in a vertical direction and is configured to guide the air blown by the air blowing unit to the recording medium conveyed by the conveyance unit, and a first heating unit and a second heating unit configured to heat the air in the duct, wherein the second heating unit is arranged downstream of the first heating unit in a direction of a current of the air generated by the air blowing unit, and wherein, when being viewed along the direction of the air current, the second heating unit includes a part not overlapping the first heating unit.

Further features of the present disclosure will become apparent from the following description of exemplary embodiments with reference to the attached drawings.

DESCRIPTION OF THE EMBODIMENTS

<Inkjet Recording Apparatus>

Figure 1:
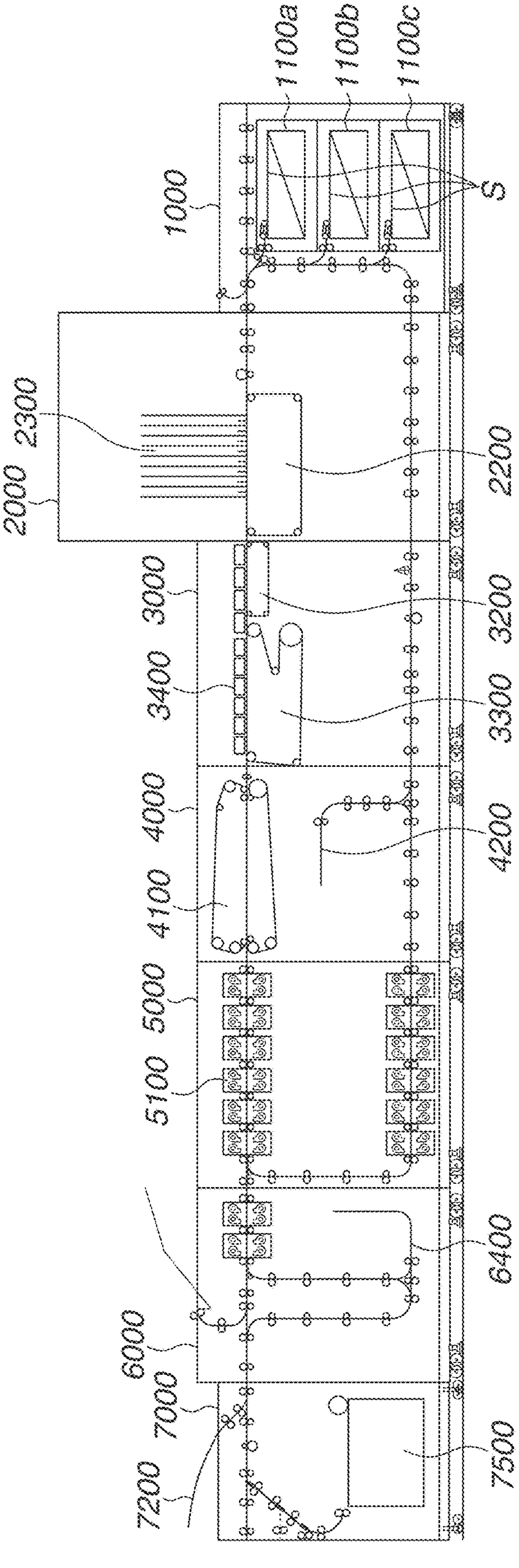
FIG. 1 is an overall configuration diagram of an image forming system.

FIG. 1 is a schematic diagram illustrating an example of a general configuration of an inkjet recording apparatus. The inkjet recording apparatus forms an ink image on a recording medium S using two liquids, a reaction liquid and ink.

In the inkjet recording apparatus according to the present exemplary embodiment, the recording medium S fed from a sheet feeding module 1000 is conveyed along a conveyance path provided in the apparatus, processed in each module, and ejected to an ejected sheet stacking module 7000.

The sheet feeding module 1000 has three storages 1100*a* to 1100*c* that store the recording medium S. The storages 1100*a* to 1100*c* can be pulled out toward the front side of the apparatus. Recording media S are fed one by one by a separation belt and a conveyance roller in the storages 1100*a* to 1100*c*, and are conveyed to an ink image formation unit 2000. The number of the storages 1100*a* to 1100*c* is not limited to three, and one or two, or four or more storages may be provided.

The ink image formation unit 2000 has a print belt unit 2200 and a recording unit 2300. The recording medium S conveyed from the sheet feeding module 1000 is corrected in skew and position by a pre-image formation registration correction unit, and is conveyed to the print belt unit 2200. The recording unit 2300 is arranged at a position facing the print belt unit 2200 with respect to the conveyance path. The recording unit 2300 performs a recording process (printing) on the conveyed recording medium S by recording heads from above to form an image on the recording medium S. The recording medium S is sucked and conveyed by the print belt unit 2200 to secure a clearance from the recording heads. A plurality of recording heads is aligned along the conveyance direction. In the present exemplary embodiment, total five line-type recording heads are provided in correspondence with ink of four colors, yellow (Y), magenta (M), cyan (C), and black (Bk), and a reaction liquid. The number of colors and the number of recording heads are not limited to five.

As an inkjet printing method, a method using a heating element, a method using a piezo element, a method using an electrostatic element, a method using a micro electro mechanical system (MEMS) element, or the like can be adopted. The inks of these colors is supplied from ink tanks not illustrated via ink tubes to the recording heads. The recording medium S on which an image has been printed by the recording unit 2300 is conveyed by the print belt unit 2200.

The skew and color density of the printed image on the recording medium S can be detected by an inline scanner arranged downstream of the recording unit 2300 in the conveyance direction, and the printed image can be corrected.

The drying module 3000 includes a decoupling unit 3200, a drying and conveyance unit 3300, and a hot air blowing unit 3400. The drying module is a unit that decreases the liquid content of the ink that is applied to the recording medium S by the recording unit 2300 to enhance the fixability of the recording medium S and the ink. The recording medium S on which the image has been printed by the recording unit 2300 of the ink image formation unit 2000 is conveyed to the decoupling unit 3200 arranged in the drying module 3000. The decoupling unit 3200 can convey the recording medium S by an air pressure from above and friction with the belt. Conveying the recording medium S held on the belt by the air pressure and the friction with the belt prevents misalignment of the recording medium S on the print belt unit 2200 where the ink image is to be formed. While the recording medium S conveyed from the decoupling unit 3200 is sucked and conveyed by the drying and conveyance unit 3300, the ink-applied surface of the recording medium S is dried by blowing hot air from the hot air blowing unit 3400 arranged above the belt.

A fixing module 4000 includes a fixing unit 4100 having a rotary member pair. The rotary member pair (upper belt and lower belt) forms a nip part. The recording medium S is conveyed from the drying module 3000 to the nip part. The fixing unit 4100 heats the rotary member pair, and the recording medium S is heated and pressed by the heated rotary member pair while being nipped and conveyed by the nip part. The fixing unit 4100 in the present exemplary embodiment has a configuration with a nip width increased. Increasing the nip width makes it possible to apply heat and pressure to the recording medium S for a long time. Accordingly, the ink applied to the recording medium S can sufficiently penetrate the recording medium S. This improves the chafing-proof properties.

A cooling module 5000 has a plurality of cooling parts 5100 to cool the high-temperature recording medium S conveyed from the fixing module 4000. Each cooling part 5100 takes in outside air by a fan into a cooling box to increase the pressure in the cooling box, and applies the air blown from a nozzle in a conveyance guide to the recording medium S, thereby to cool the recording medium S. The cooling parts 5100 are arranged on both sides of the conveyance path and thus can cool the recording medium S from the both sides. The cooling module 5000 has a conveyance path switching part therein. The conveyance switching part switches the conveyance path between the conveyance path for conveying the recording medium S to a reversing module 6000 and the conveyance path for conveying the recording medium S to a double-sided conveyance path to be used in double-sided printing.

In double-sided printing, the recording medium S is conveyed to the conveyance path below the cooling module 5000. Accordingly, the recording medium S is conveyed along the double-sided conveyance path having the fixing module 4000, the drying module 3000, the ink image formation unit 2000, and the sheet feeding module 1000. The recording medium S is conveyed again to the ink image formation unit 2000 and an ink image is printed on the recording medium S by the recording unit 2300.

The double-sided conveyance part of the fixing module 4000 has a reversing part 4200 that reverses the recording medium S. The reversing module 6000 has a reversing part 6400 that can reverse the conveyed recording medium S to freely change the front and back sides of the recording medium S to be ejected.

The ejected sheet stacking module 7000 includes a top tray 7200 and a stacking part 7500 to align and stack the recording medium S conveyed from the reversing module 6000.

<Drying Module>

Figure 2:
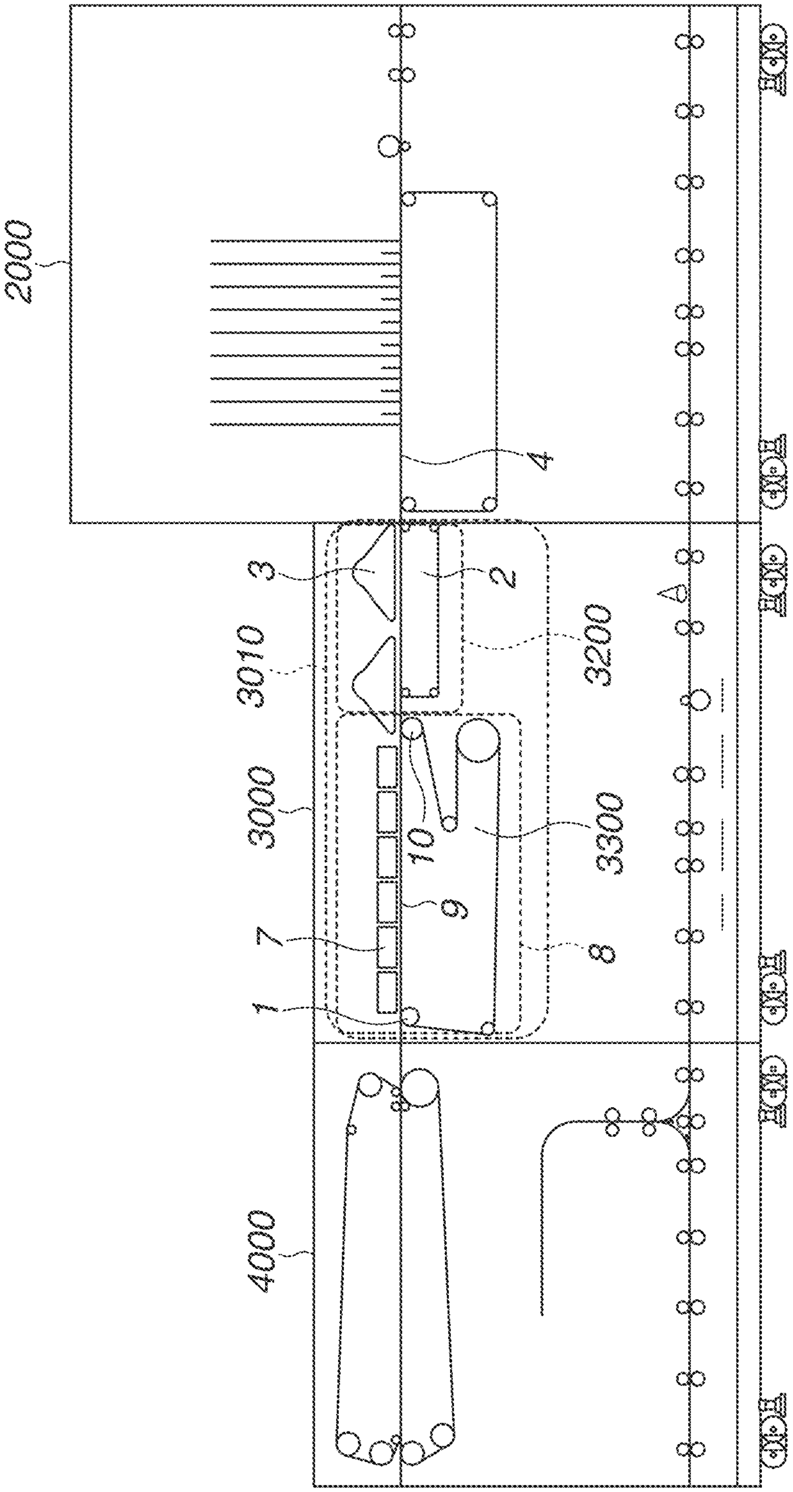
FIG. 2 is a configuration diagram of a system related to a drying function unit.

A drying functional unit 3010 of the drying module 3000 will be described in detail with reference to FIG. 2.

As described above, the drying module 3000 has the drying functional unit 3010 located at the upper side.

The drying functional unit 3010 has a linear sheet conveyance path 1 for receiving the recording medium S ejected from the ink image formation unit 2000, drying the recording medium S, and delivering the recording medium S to the fixing module 4000. The linear sheet conveyance path 1 is different in function between the upstream part and the downstream part.

The upstream part of the drying functional unit 3010 includes a decoupling unit 3200 that is constructed of a decoupling belt 2 and a cool air blowing unit 3. The upstream part blows cool air onto the recording medium S from above the decoupling belt 2 in a vertical direction to convey the recording medium S while pressing the recording medium S against the decoupling belt 2. When the leading end of the recording medium S reaches the decoupling belt 2 of the drying module 3000, the trailing end side of the recording medium S is still on a print belt 4 of the ink image formation unit 2000. Because the recording medium S undergoes printing on the print belt 4, the recording medium S is sucked and conveyed on the print belt 4. In order not to cause a disturbance to the printing step, the force of pressing the recording medium S against the decoupling belt 2 is weaker than the sucking force of the print belt, and the decoupling belt 2 is driven at a slightly higher speed than the print belt 4. That is, while the trailing end side of the recording medium S is on the print belt 4, the recording medium S can always slip on the decoupling belt 2. On the other hand, once the trailing end of the recording medium S exits the area of the print belt 4, the conveyance of the recording medium S depends on the decoupling belt 2. At this time, it is necessary to control the blowing force of the cool air blowing unit 3 to prevent the sheet from slipping due to the conveyance resistance. The speed of the air from the cool air blowing unit 3 to the sheet conveyance path 1 is controlled under a predetermined pressure using a pressure sensor provided in the cool air blowing unit 3 and an air blowing unit provided in the intake part, and a blowing force is applied to the recording medium S. The cool air blowing unit 3 has a large number of holes for letting pass the air to the outlet of the air blowing duct so as to uniformly apply the pressing force to the recording medium S.

The downstream part of the drying functional unit 3010 has a drying part 8 that is constructed of a drying and conveyance unit 3300 and a drying unit 7, and fixes the recording medium S onto a drying belt 9 by sucking the recording medium S by the drying and conveyance unit 3300. Further, the downstream part blows hot air onto the recording medium S from above in the vertical direction.

Accordingly, the downstream part dries and conveys the recording medium S while suppressing undulations called cockling. In order to swiftly dry the recording medium S, the surface temperature of the drying belt 9 is controlled to a predetermined temperature via a heater roller 10. On the other hand, the temperature of the hot air in the drying unit 7 is controlled to a predetermined temperature by a temperature sensor 11 as a temperature detection member and sheathed heaters 12 that are provided in the drying unit 7. The speed of the air output from a hot air blowing hole is controlled under a predetermined pressure by a pressure sensor 13 provided in the drying unit 7 and an air blowing unit 21 provided in the intake air part.

<Drying Unit 7>

The drying unit 7 has a large number of holes for letting pass the air at the outlet of an air blowing duct 19 in order to uniformly dry the recording medium S. The air blowing duct 19 has the role of guiding the air to the recording medium S. In order to fix the recording medium S onto the drying belt 9, the suction pressure on the upper surface of the drying belt 9 is controlled to a predetermined pressure by a pressure sensor (not illustrated) provided in a suction box and an exhaust fan (not illustrated) provided in an exhaust part. The drying belt 9 has a large number of holes for uniformly sucking the recording medium S.

Figure 3:
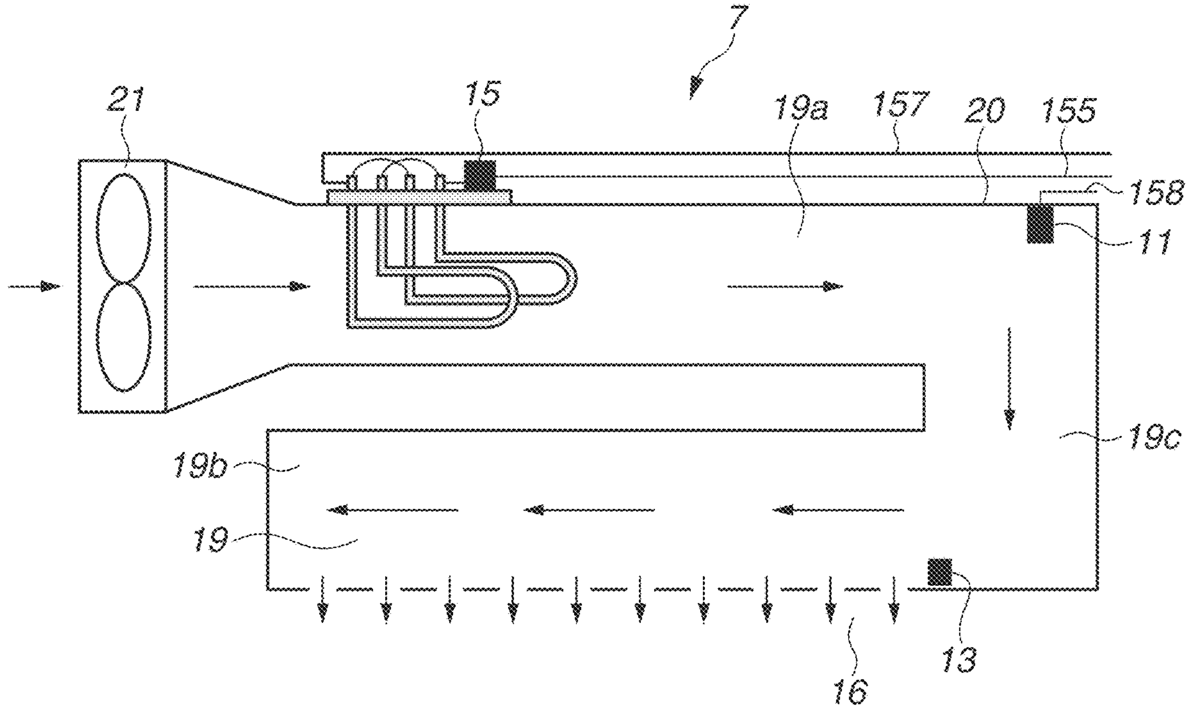
FIG. 3 is a configuration diagram of a drying unit.

Details of the drying unit 7 will be described below. As illustrated in FIG. 3, the drying unit 7 has a fan as the air blowing unit 21 to blow the air from the outside. The air blowing unit 21 generates an air current in the air blowing duct 19 and sends the air to the holes formed at the outlet of the air blowing duct 19. The air blowing duct 19 has the sheathed heaters 12 to heat the air. In the present exemplary embodiment, the drying unit 7 has two sheathed heaters 12, a first heating unit 12*a* and a second heating unit 12*b*. The drying unit 7 further has a thermo-switch 15 that protects the sheathed heaters 12 in the event of an abnormal temperature increase. The first heating unit 12*a* is positioned upstream of the second heating unit 12*b* in the direction of an air current in the air blowing duct 19. The air blowing duct 19 has a first path 19*a* in which the sheathed heaters 12 are provided, a second path 19*b* in which the air blowing holes of the duct are formed, and a third path 19*c* that connects the first path 19*a* and the second path 19*b*. The first path 19*a* in the present exemplary embodiment is formed so as to extend from the back side to the front side of the inkjet recording apparatus. In the first path 19*a*, the air blowing unit 21 blows the air from the back side to the front side of the inkjet recording apparatus. That is, the direction of an air current in the present exemplary embodiment is the direction of an air current formed in the first path 19*a*, which coincides with the direction from the back side to the front side of the inkjet recording apparatus.

In the direction of an air current, the temperature sensor 11 is arranged to detect the temperature of the air in the air blowing duct 19 downstream of the sheathed heaters 12. Because the inkjet recording apparatus in the present exemplary embodiment is configured to blow hot air onto the recording medium S, the temperature sensor 11 is preferably arranged at a position closer to air blowing holes 16. Accordingly, the temperature sensor 11 in the present exemplary embodiment is arranged downstream of the sheathed heaters 12 in the first path 19*a*, or in the second path 19*b* or the third path 19*c*. The inside of the air blowing duct 19 is controlled at a target temperature (120° C. at maximum) by controlling the sheathed heaters 12 from the results of detection by the temperature sensor 11.

The wiring to which the sheathed heaters 12 and the temperature sensor 11 are electrically connected passes above a top plate 20. For this reason, there is no deterioration in the efficiency due to interference with the air path as compared to the case where the wiring is placed in the path. In the part above the top plate 20, the external air passes and the temperature is lower than that in the first path 19*a* and the air blowing duct 19, and thus electrical wires low in heat resistance can be used. That is, electrical wires 155, 157, and 158 for use in the drying unit 7 can be electrical wires low in heat resistance. This suppresses the cost rather than in the case of using heat-resistant electrical wires.

Arranged in the vicinity of the air blowing holes 16 is the pressure sensor 13 that detects the pressure of the air in the third path 19*c*.

In the present exemplary embodiment, a plurality of drying units 7 is arranged. In the conveyance direction of the recording medium, the plurality of drying units 7 is arranged adjacent to each other.

Figure 5:
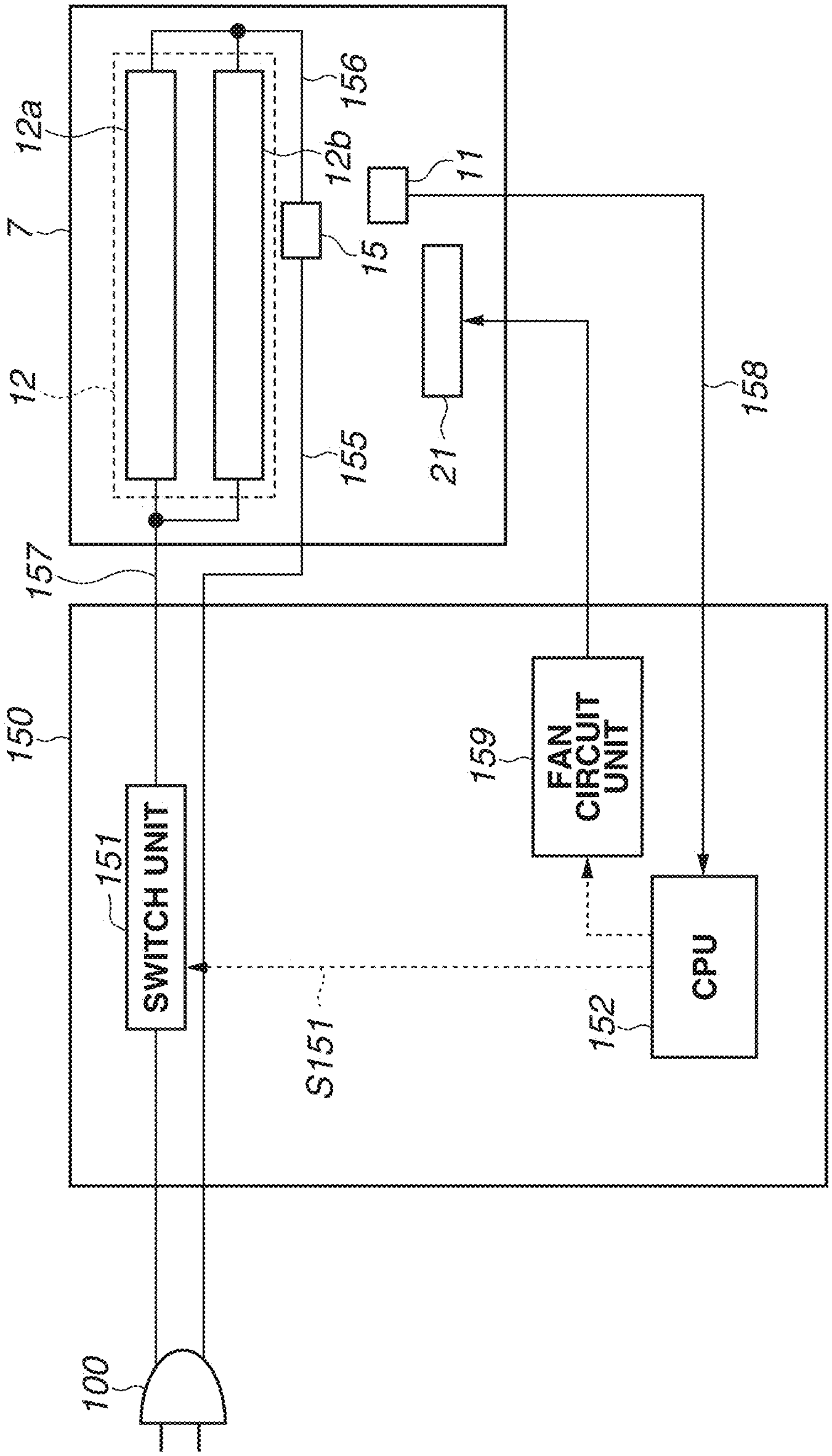
FIG. 5 is a control block diagram of a sheathed heater.

FIG. 5 is a circuit configuration diagram illustrating a schematic configuration of a control circuit board 150 for driving the sheathed heaters 12 in the present exemplary embodiment. The drying module 3000 includes a power cord 100, the control circuit board 150, and the drying units 7. Each drying unit 7 includes the sheathed heater 12, the temperature sensor 11, and the air blowing unit 21. The control circuit board 150 includes a central processing unit (CPU) 152, a fan circuit unit 159, and a switch unit 151. The sheathed heater 12 is constructed of two heating units, the first heating unit 12*a* and the second heating unit 12*b* that are electrically connected in parallel. The switch unit 151 is an element for switching the state of the sheathed heater 12 between the state of being shut off from an alternating-current power source and the state of being connected to the alternating-current power source. The switch unit 151 may be a switching element such as a triac, a transistor, or an insulated gate bipolar transistor (IGBT), for example. The thermo-switch 15 is connected to a path of the sheathed heater 12 in the drying unit 7. In the event of an abnormal temperature increase of the sheathed heater 12, when the thermo-switch 15 reaches 200° C., the bimetal in the thermo-switch 15 reacts to shut off the alternating-current power source. The wiring from the control circuit board 150 to the sheathed heater 12 is formed of the electrical wire 157, the wiring from the sheathed heater 12 to the thermo-switch 15 is formed of an electrical wire 156, and the wiring from the thermo-switch 15 to the control circuit board 150 is formed of the electrical wire 155.

The CPU 152 turns on the fan circuit unit 159 to drive the air blowing unit 21 at the predetermined timing.

The temperature sensor 11 detects the temperature in the first path 19*a* and supplies temperature information to the CPU 152. The CPU 152 determines a duty cycle of illumination of the sheathed heater 12 from the information detected by the temperature sensor 11. The CPU 152 outputs a signal S151 for switching the state of the sheathed heater 12 between the connected state and the shut-off state to the switch unit 151 in accordance with the determined duty cycle of illumination. The duty cycle of illumination of the sheathed heater 12 is determined in the cycle of 10 seconds from the information detected by the temperature sensor 11, and the switching of the switch unit 151 takes place in two half-wave periods of the alternating-current power source as a unit. The wiring from the control circuit board 150 to the temperature sensor 11 is formed of the electrical wire 158.

Figure 6A:
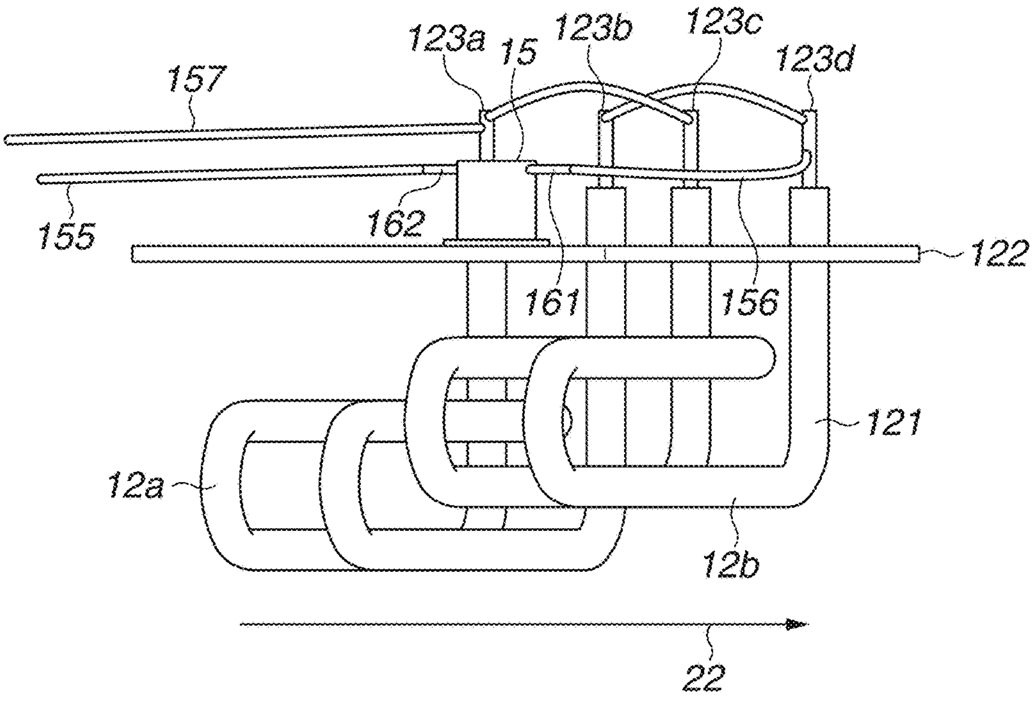
FIGS. 6A and 6B are configuration diagrams of sheathed heaters.

FIG. 6A is a schematic view of the sheathed heater 12 in the present exemplary embodiment. The sheathed heater 12 has a nichrome wire in a metal pipe 121. When a voltage is applied, the nichrome wire generates heat to heat the metal pipe 121. As insulating powder, magnesium oxide is charged between the nichrome wire and the metal pipe 121 to insulate the nichrome wire and the metal pipe 121 from each other. The metal pipe 121 is held by a metallic flange 122 with a thickness of 3 mm that covers the upper part of the metal pipe 121. The flange 122 is fixed to the top plate 20 of the drying unit 7 to form an enclosed space in the first path 19*a* of the drying unit 7. The electrical wire 157 laid from the control circuit board 150 to the sheathed heater 12 is connected to sheathed heater terminals 123*a* and 123*c*. The electrical wire 156 laid from the sheathed heater 12 to the thermo-switch 15 is connected to sheathed heater terminals 123*b* and 123*d* and a thermo-switch terminal 161. The electrical wire 155 laid from the thermo-switch 15 to the control circuit board 150 is connected to a thermo-switch terminal 162.

Figure 8:
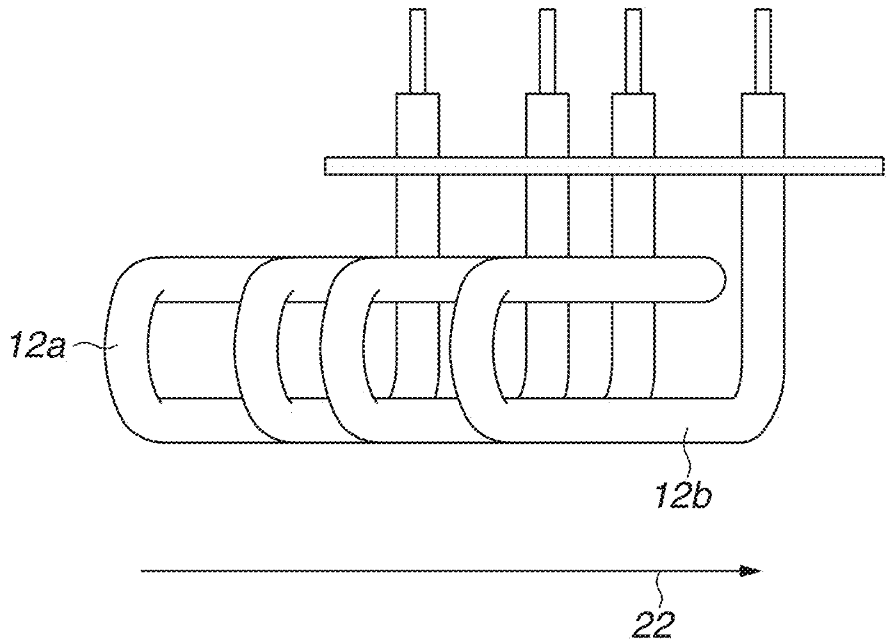
FIG. 8 is a configuration diagram of a sheathed heater for describing an issue.

FIG. 8 is a diagram illustrating arrangement of a comparative sheathed heater 12. A first heating unit 12*a* and a second heating unit 12*b* are aligned in the direction of an air current. More specifically, when the second heating unit 12*b* is viewed in the direction of an air current, the first heating unit 12*a* and the second heating unit 12*b* overlap. Accordingly, the air current having not been blocked by the first heating unit 12*a* is also not blocked by the second heating unit 12*b*, and it is thus difficult to effectively heat the air. This decreases the efficiency of heating the air.

In order to address the above, the drying unit 7 in the present exemplary embodiment has the first heating unit 12*a* and the second heating unit 12*b* arranged so as to be shifted from each other. Specific configuration will be described below.

Arrow 22 indicates the direction of an air current in the first path 19*a*. The first heating unit 12*a* and the second heating unit 12*b* electrically connected in parallel are arranged at positions shifted from each other in a direction perpendicular to the direction of an air current.

Figure 4:
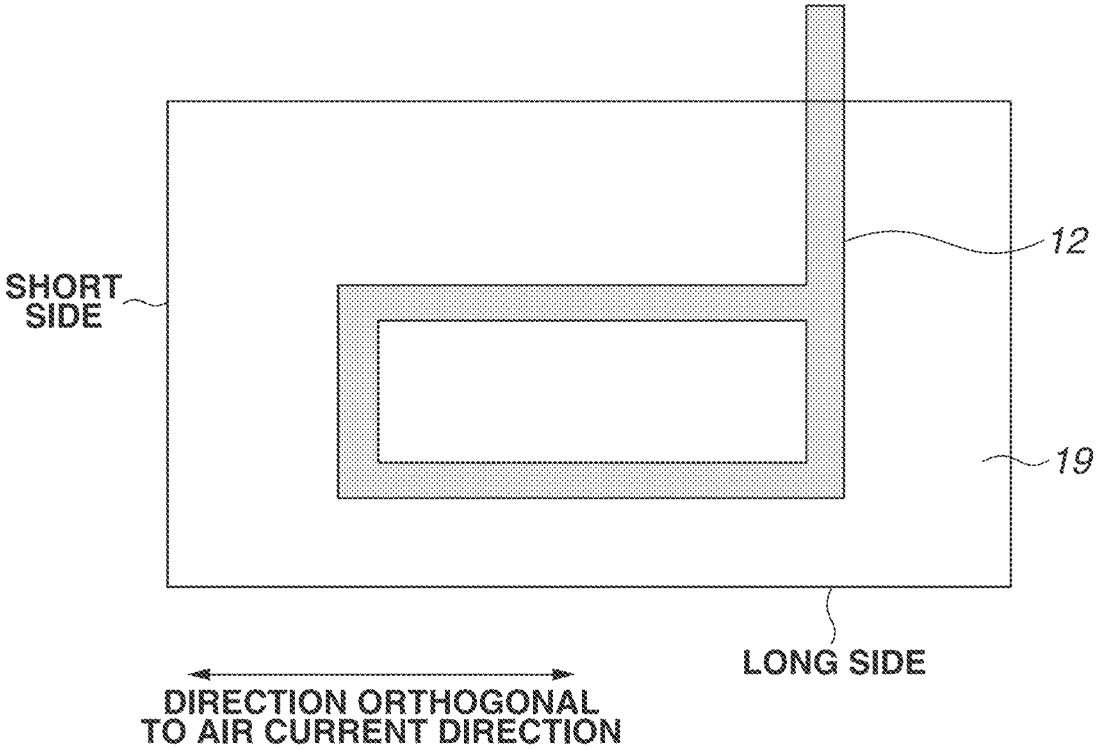
FIG. 4 is a cross-sectional view of an air blowing duct taken along a direction orthogonal to a direction of an air current.

In the present exemplary embodiment, the first heating unit 12*a* and the second heating unit 12*b* are sheathed heaters identical in thickness. In the direction orthogonal to the direction of an air current shown by the arrows in FIG. 4, the first heating unit 12*a* and the second heating unit 12*b* have the same maximum width. FIG. 4 illustrates a cross section taken along the direction orthogonal to the direction of an air current. The air blowing unit 21 is arranged on the back side of the plane of the drawing.

As illustrated in FIG. 6A, the first heating unit 12*a* and the second heating unit 12*b* are arranged so as to be shifted from each other in the vertical direction. In the present exemplary embodiment, the first heating unit 12*a* and the second heating unit 12*b* are identical in thickness and length as described above. Because the first heating unit 12*a* and the second heating unit 12*b* are arranged so as to be shifted from each other, the air fed by the fan can be blocked by the first heating unit 12*a* and the second heating unit 12*b* to efficiently heat the air.

Figure 6B:
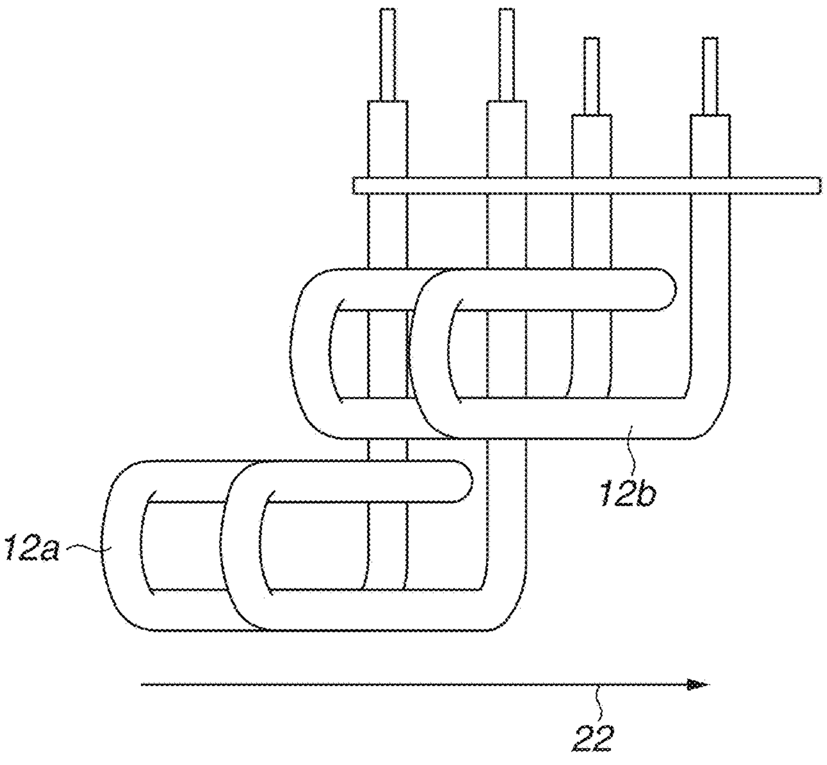

The present application is not limited to the arrangement and configuration illustrated in FIG. 6A, and the first heating unit 12*a* and the second heating unit 12*b* may be arranged and configured as illustrated in FIG. 6B. Arrow 22 indicates the direction of an air current in the first path 19*a*. If the first path 19*a* is sufficiently large, the first heating unit 12*a* and the second heating unit 12*b* electrically connected in parallel can be arranged at positions completely shifted in a direction perpendicular to the direction of an air current. The second heating unit 12*b* does not block the air ventilation of the first heating unit 12*a*, and can efficiently heat the air when the sheathed heater 12 generates heat. Accordingly, the time until the air in the air path reaches the predetermined temperature becomes shorter with increased efficiency.

As described above, the first heating unit 12*a* and the second heating unit 12*b* are arranged so as to be shifted from each other in the present exemplary embodiment. That is, when the second heating unit 12*b* is viewed from the direction of an air current, the second heating unit 12*b* has a part that does not overlap the first heating unit 12*a*. The part not overlapping is located in the flow path of the air having not been blocked by the first heating unit 12*a*. For this reason, it is possible to efficiently heat the air as compared to the case where the first heating unit 12*a* and the second heating unit 12*b* are arranged so as to entirely overlap.

Figure 7:
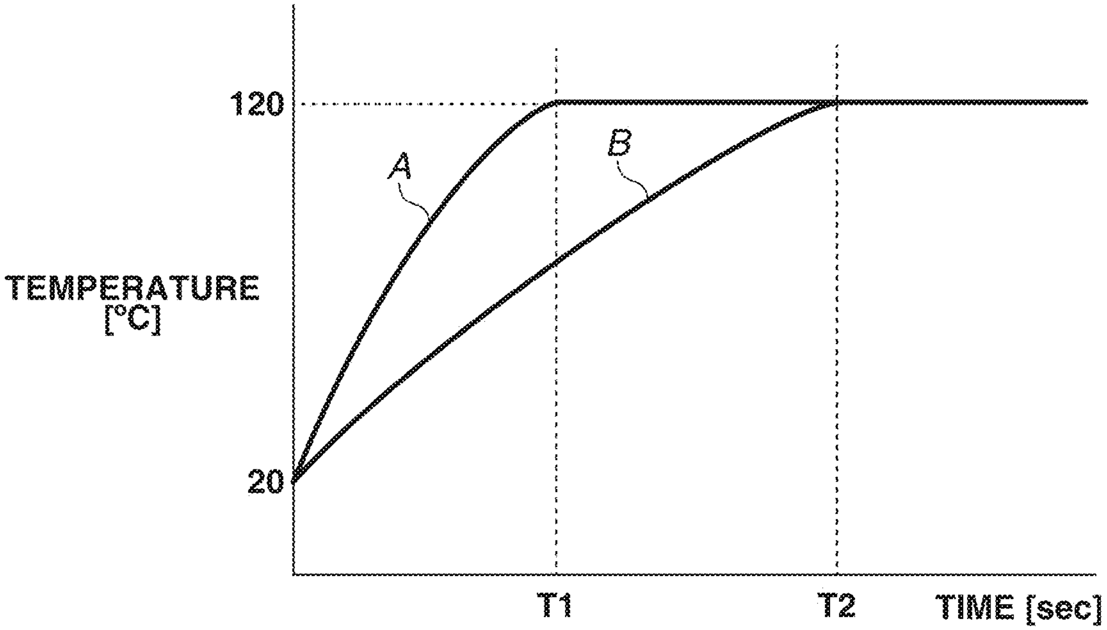
FIG. 7 is a graph of temperatures detected by a temperature sensor.

FIG. 7 illustrates the temporal transition of temperature detected by the temperature sensor 11 in the present exemplary embodiment. A waveform A indicates temporal changes in the detected temperature with the sheathed heater 12 arranged as illustrated in FIG. 6A. A waveform B indicates temporal changes in the detected temperature with the sheathed heater 12 arranged as illustrated in FIG. 8. FIG. 7 illustrates a state where the time until a predetermined temperature is reached is shorter with the waveform A than the waveform B.

In the present exemplary embodiment, the first heating unit 12*a* and the second heating unit 12*b* are identical in thickness and length in the direction orthogonal to the direction of an air current. However, the present disclosure is not limited to this configuration. If there is a part where the heating units do not overlap even with different thicknesses when being viewed from the direction of an air current, it is possible to produce the advantageous effect of increasing the heating efficiency.

In the cross section illustrated in FIG. 4, the air blowing duct 19 has a rectangular shape in which the short sides are formed in the vertical direction and the long sides are formed in the direction orthogonal to the direction of an air current. In the cross section described above, the air blowing duct 19 has the rectangular shape, so that the first heating unit 12*a* and the second heating unit 12*b* are shaped so as to extend in the direction orthogonal to the direction of an air current. Because the first heating unit 12*a* and the second heating unit 12*b* are shaped as described above, the proportion of the first heating unit 12*a* and the second heating unit 12*b* in the cross section area of the air blowing duct 19 becomes large. This leads to enhancement of the efficiency in the air blowing duct 19.

The sheathed heater 12 has been described as a heater of two units. However, the present application is not limited to the configuration in which the heater includes two units, and the heater may include three or more units.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-071900, filed Apr. 25, 2023, which is hereby incorporated by reference herein in its entirety.

What is claimed is:

1. An inkjet recording apparatus comprising:

an ink image formation unit configured to form an ink image on a recording medium; and a drying module configured to dry the recording medium on which the ink image is formed by the ink image formation unit, wherein the drying module includes:

a conveyance unit configured to convey the recording medium, an air blowing unit configured to blow air, a duct that is arranged above the conveyance unit in a vertical direction and is configured to guide the air blown by the air blowing unit to the recording medium conveyed by the conveyance unit, and a first heating unit and a second heating unit configured to heat the air in the duct, wherein the second heating unit is arranged downstream of the first heating unit in a direction of a current of the air generated by the air blowing unit, and wherein, when being viewed along the direction of the air current, the second heating unit includes a part not overlapping the first heating unit.

2. The inkjet recording apparatus according to claim 1, further comprising a fixing unit that is arranged downstream of the drying module in a conveyance direction of the recording medium, wherein the fixing unit has a rotary member pair configured to form a nip part, and is configured to perform fixing by nipping and conveying the recording medium with the nip part while applying heat and pressure to the recording medium.

3. The inkjet recording apparatus according to claim 1, wherein the first heating unit and the second heating unit are sheathed heaters.

4. The inkjet recording apparatus according to claim 1, wherein the first heating unit and the second heating unit are identical in maximum width in a direction orthogonal to the direction of the air current.

5. The inkjet recording apparatus according to claim 1, wherein the first heating unit and the second heating unit have a part extending along a conveyance direction of the recording medium.

6. The inkjet recording apparatus according to claim 1, wherein the air blowing unit is configured to blow the air from a back side of the inkjet recording apparatus to a front side of the inkjet recording apparatus, wherein the duct is configured to guide the air from the back side to the front side of the inkjet recording apparatus, and wherein the first heating unit and the second heating unit are arranged in a first path.

7. The inkjet recording apparatus according to claim 6, wherein the first path has a rectangular shape with a short side in the vertical direction when the first path is viewed from a front side to a back side of the inkjet recording apparatus.

8. The inkjet recording apparatus according to claim 1, further comprising a temperature detection member configured to detect a temperature in the duct and arranged downstream of the second heating unit in the direction of the air current.

9. The inkjet recording apparatus according to claim 1, wherein the drying module includes a plurality of drying units each having the air blowing unit, the duct, the first heating unit, and the second heating unit, and wherein the plurality of drying units is arranged adjacent to each other in a conveyance direction of the recording medium.

10. The inkjet recording apparatus according to claim 1, wherein the air blowing unit is arranged upstream of the first heating unit in the direction of the air current.

11. The inkjet recording apparatus according to claim 10, wherein the air blowing unit is a fan.

* * * * *